Patented July 26, 1938

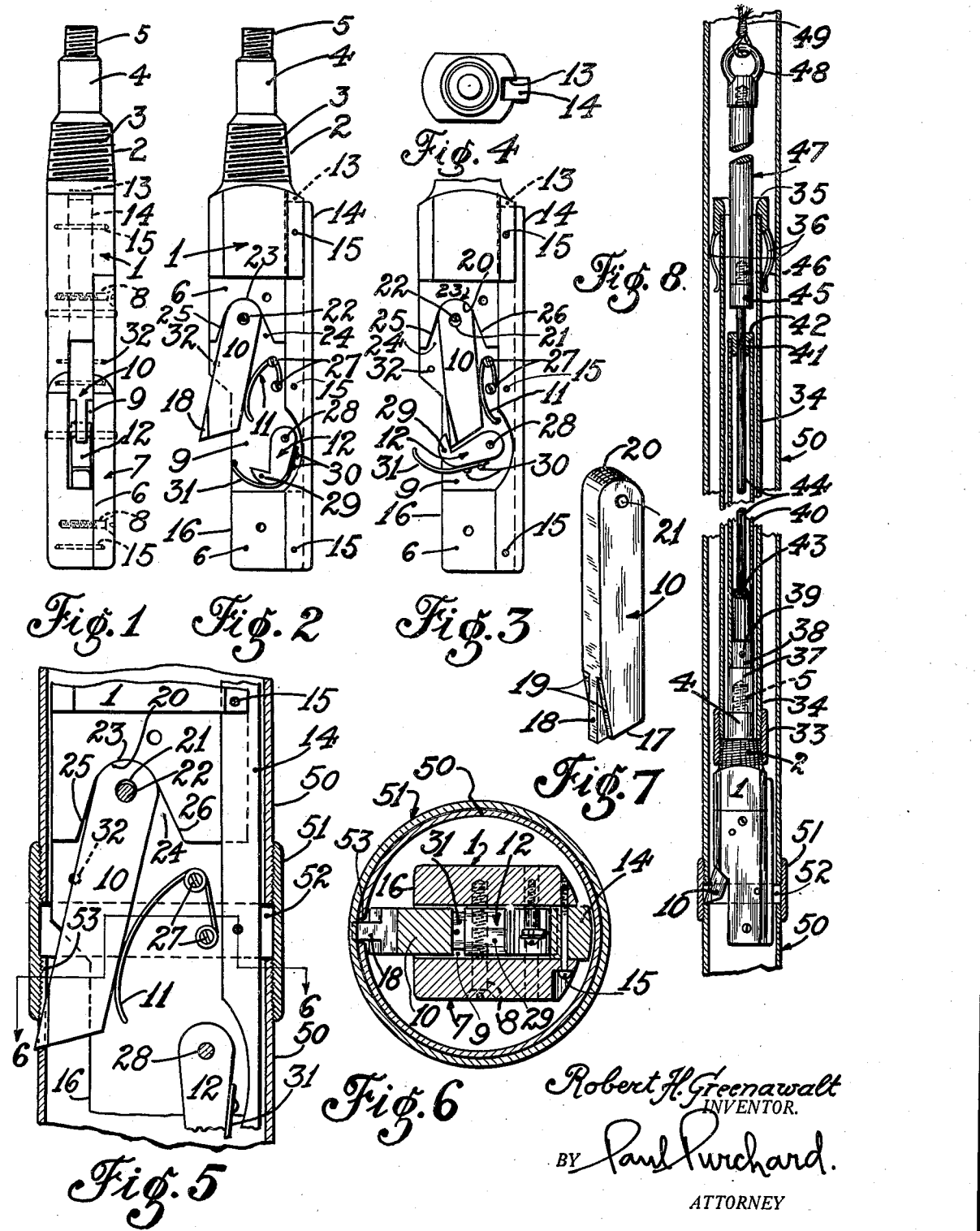

2,124,617

UNITED STATES PATENT OFFICE 2,124,617

CASING CUTTER

Robert H. Greenawalt, Conoquenessing, Pa.

Application June 23, 1937, Serial No. 149,804

6 Claims. (Cl. 164—0.3)

This invention relates to pipe cutters, and more in particular to cutters for cutting or slotting the casings of abandoned oil-wells, etc., placed very deeply in the ground.

One of the primary objects of this invention is to provide a tool for cutting casings in abandoned wells, where said casings cannot be pulled out directly because of sediment or dirt settling around the lower joints, or where the casings cannot be extracted because of the absence on the site of suitable derricks or other heavy machinery usually needed for the purpose.

Another object of this invention is to provide a tool which can be easily and quickly adjusted to cut casings of different diameters. A further object is the provision of a cutting tool which is very simple in construction and application, relatively light in weight and which, by actual experience in the field, has proven to be very efficient and quick in the performance of its purpose.

Additional features and advantages of this invention will appear in the course of the following description considered in connection with the accompanying drawing forming a part of this application.

In the drawing:—

Fig. 1 is a front elevation of the casing cutting tool.

Fig. 2 is a side elevation thereof, with the removable cover taken off and the cutter proper shown in operative position.

Fig. 3 is a similar view, but with the cutter held in inoperative position.

Fig. 4 is a top plan view of the cutting tool.

Fig. 5 is an enlarged fragmentary sectional view showing the cutting tool in a well-casing, the lower pipe section of which has been partly slotted longitudinally to free it from its corresponding pipe coupling, upon exerting an upward pull on the upper part of the well-casing.

Fig. 6 is a cross-sectional view taken substantially on line 6—6 in Fig. 5.

Fig. 7 is a perspective view of the cutter or knife proper of the cutting tool.

Fig. 8 is a sectional longitudinal view through a casing-line in which the casing cutter has been lowered in position ready to partly slot, longitudinally, the lowermost length of casing.

Reference being had to the drawing, the casing cutting tool comprises a main body 1 of particylindrical cross-section, having at its upper end a tapered portion 2 provided with suitable pipe-threads 3 surmounted by a straight cylindrical shank 4 and a straight, threaded, stud 5.

On one of its flat sides, the body is recessed, as at 6, to accommodate a cover 7 suitably shaped to conform to the general contour of the body and secured thereto by means of screws 8. A deeper recess 9 is also cut to freely accommodate the casing cutter proper 10, the cutter-spring 11 and the dog 12. On the rear, cylindrical, side of the body there is cut a longitudinal groove 13 wherein insert-strips of various depths may be inserted to adapt the tool to casings of different bores. Pins or screws 15 are used to secure the insert strips 14 in the main body. The lower part of the cylindrical front side of the body is preferably cut partly away to produce a flat face 16, to better expose the sharp end of the cutter, reduce the weight of the whole tool and also facilitate its introduction in the casing to be cut.

The casing cutter 10 is made of tool steel and its lower end is tapered upwardly towards the rear, as at 17, to provide a favorable cutting angle. The actual cutting-knife 18 is substantially narrower than the cutter and is placed thereon centrally, thus providing the two shoulders 19 which act as stops to limit the depth of the cut, so that the cutting will be limited practically to the thickness of the casing and not materially affect the coupling of the same, thereby considerably reducing the task imposed on the cutting tool.

The upper end of the cutter is rounded, as at 20, and has a drilled hole 21 which freely receives a pivot-pin 22 mounted in the main body and on which the cutter is pivoted. The rounded end of the cutter fits into the accordingly rounded bottom 23 of the V-shaped socket 24 cut in the main body. The sides 25 and 26 of this socket are suitably inclined to allow the required angular movement of the cutter. The reason for making the hole 21 larger than the diameter of the pin 22 is to relieve the latter of any stress imposed during the slotting operation on a casing, these stresses being absorbed by the rounded bottom of the socket, while the outward flaring thrust of the cutter is limited and resisted by the bevelled side 25 of the said socket.

The cutter is acted upon by a spring of any desired and suitable type, such as the wire spring 11, secured in the recess 9 by means of pins or screws 27. The tendency of this spring is to force the cutter outwardly into effective, or slotting, position, as will be readily understood.

In order to faciliate the lowering of the cutting tool into a casing, the cutter must be withdrawn into the main body; this is accomplished by means of the dog 12, pivotally mounted at its upper end on a pin 28 secured in the main body, said dog having an angularly disposed catch-lug 29 adapted to engage the lower end of the cutter.

At the rear of the cutter there is secured by screws or pins 30 the flat, resilient, foil 31, the free end of which is suitably curved upwardly and which, when the dog engages the cutter, extends somewhat beyond the outer periphery of the front side of the cutting tool, so that, when the latter is lowered into a casing, the foil will assist in holding the cutter in its withdrawn position. On the other hand, when the cutting tool is pulled upward in the casing, the friction between the latter and said foil will cause the disengagement of the dog from the cutter, and the latter will assume the operative position shown in Figs. 2, 5 and 8.

The diameter of the body of the cutting tool is made such as to suit the bore of the smallest casing generally used in oil-fields. If larger casings are to be cut, an insert-strip 14 of suitable depth may be readily substituted in the longitudinal groove 13, by simply extracting the pins or screws 15, removing the small insert-strip and inserting instead a larger one which is properly secured in place by replacing the holding means 15.

In the front of the cutter, there is drilled through the main body 1 a hole 32 for the insertion therein of a cotter-pin (not shown), or the like, whereby the cutter may be held positively within the body without the assistance of the dog 12, which is also held within the main body by gravity. This pin is used at the time when the depth of the oil-well is to be measured to ascertain the amount of casing which may be salvaged. If desired, a string or cord (not shown) may be attached to said cotter-pin, or to any other desired part of the cutting tool, and the length of said cord measured to determine the free depth of the well.

The various accessorial parts used in connection with the cutting tool are shown in Fig. 8.

To the threaded portion 2 of the cutting-tool is secured by means of the pipe coupling 33 the so-called "weight-pipe" 34, measuring about twelve feet and provided at its upper end with a centering device intended to guide the tool in the casing. As shown, this centering device comprises a collar 35 screwed on the weight-pipe and having suitably shaped resilient fingers 36 which yieldingly engage the inside of the casing. Also, to the stud 5 is screwed the cylindrical plug 37 having a reduced shank 38 to which is fastened by means of the pin 39 the tubular jar-guide 40, approximately three feet long and having at its upper end a guide and stop bushing 41 provided with an outward flange 42 resting on the upper end of the jar-guide.

Longitudinally movable within the jar-guide is the jar proper comprising the lower guide-collar 43, the plunger-rod 44 and the head 45 having a threaded stud 46 to which a heavy sinker-rod 47, about twelve feet long, is secured. At the upper end of the latter there is screwed the eye-socket 48 to which is attached the lower end of the cable 49 by means of which the jar may be raised as high as the stop bushing 41 will permit. When the jar is suddenly dropped, its head 45 strikes the guide-bushing flange 42 and the impact is transmitted to the casing-cutter 10, whereby a slot of sufficient length may be cut in the upper end of the lowermost casing 50, to free same from the coupling 51, when a strong upward pull is exerted on the upper string of casings.

From the above description, the mode of application and operation of this device will be readily understood and may be briefly described to be as follows:—As is well known, an oil-well consists of a series of casings 50 driven into the ground and secured together by means of threaded pipe couplings 51. The length of the threads in the latter is such as to leave a clearance 52, varying from one-half inch to over an inch, between two juxtaposed casing-ends.

When the casing of an abandoned well is to be salvaged, the depth of the recoverable casing is first measured by locking the cutter 10 into inoperative position, by means of the above mentioned cotter-pin inserted in the hole 32, and lowering the tool into the oil-well as far down as possible, that is, until the tool strikes an impassable body of sediment which may have accumulated in the casing, or a so-called "packer" which had been purposely forced into the lowermost casing-length at the time the exploitation of the well was stopped, to prevent the entrance of mud, sand, etc.

If the recoverable casing is of sufficient value to justify further labor, the cutting tool is again lowered into the well, the cotter-pin having first been removed and the cutter 10 held in inoperative position by means of the dog 12. When the tool reaches the lowermost position, which fact may be easily ascertained by the nature of the sound produced by the impact of the tool, the latter is slowly raised, whereby the dog 12 will disengage the cutter 10, and the latter, due to the spring 11, will then snap into the clearance space 52 between the next following juxtaposed casing-ends. This condition will be shown by the failure of the tool to drop when the tension in the cable-line 49 is released and by the metallic sound produced by the impact, showing that the edge of the cutter 10 is resting directly on the upper end of the lowermost casing-length 50. At this stage, an upward pull on the line of casings is exerted by means of a pulling machine, or a tractor with rope-blocks, and the sinker-rod and jar are now alternately raised and dropped by means of an engine and reel for the cable 49 mounted on a small truck. The impact due to the weight of the sinker and jar on the jar-guide will be transmitted to the cutter 10, and the latter will speedily cut through the casing a longitudinal slot 53 (Figs. 5 and 6), which will cause the collapse of the slotted casing end, owing to the strong upward pull exerted on the upper string of casings. The latter will jerk up away from the lowermost casing-length and may be pulled out altogether by means of the above mentioned pulling machine, etc.

Numerous applications of this cutting tool in oil-fields have proven that casings may be cut for extraction from deep wells in much less time, with considerably less help and very much lighter machinery, than is required with the various tools or methods now in common use.

As will be understood, there may be changes made in the construction and arrangement of the details of this invention without departing from the field and scope of the same, and it is intended to include all such variations, as fall within the sphere of the appended claims, in this application in which the preferred form only of the invention has been disclosed.

I claim:

1. A cutting tool for casings and the like, comprising a main body; a casing cutter rockably mounted at its upper end within the body; means to limit the rocking movements of said cutter; spring means to force the cutter into operative position; locking means effective on the lower end of the cutter to hold same into inoperative position, and means positioned on said locking means to automatically release the cutter into operative position by the upward travel of the tool within a casing.

2. A cutting tool for casings and the like comprising a main body; a casing cutter rockably mounted at its upper end within said body; means to limit the rocking movements of said cutter; spring means to force the cutter into operative position; a detent rockably mounted in said body and effective on the lower end of the cutter to hold same into inoperative position, and means positioned on said detent to automatically release the cutter into operative position by the upward travel of the tool within a casing.

3. A cutting tool of the character described comprising a main body; a casing cutter rockably mounted at its upper end within said body; means to limit the rocking movements of said cutter; spring means to force the cutter into operative position; a detent rockably mounted at its upper end in said body and having at its lower end a lug adapted to engage the lower end of said cutter to hold same into inoperative position, and a resilient member positioned at the lower end of said detent constructed to automatically release the cutter into operative position by the upward travel of the tool within a casing.

4. A cutting tool for casings and the like comprising a main body; a casing cutter rockably mounted at its upper end within said body; means to limit the rocking movements of said cutter; spring means to force the cutter into operative position; locking means effective on the lower end of the cutter to hold same into inoperative position; means positioned on said locking means to automatically release the cutter into operative position by the upward travel of the tool within a casing, and means to limit the penetration of said tool through the wall of said casing.

5. A cutting tool for casings and the like comprising a main body; a casing cutter rockably mounted at its upper end within said body; means to limit the rocking movements of said cutter; spring means to force the cutter into operative position; locking means effective on the lower end of the cutter to hold same into inoperative position; means positioned on said locking means to automatically release the cutter into operative position by the upward travel of the tool within a casing, and means positioned on the cutter to limit the penetration thereof through the wall of said casing.

6. A cutting tool for casings and the like comprising a main body; a casing cutter rockably mounted at its upper end within said body; means to limit the rocking movements of said cutter; spring means to force the cutter into operative position; locking means effective on the lower end of the cutter to hold same into inoperative position; means positioned on said locking means to automatically release the cutter into operative position by the upward travel of the tool within a casing, and means integral with said cutter to positively limit the penetration thereof through the wall of said casing.

ROBERT H. GREENAWALT.